C. M. TILBURY.
GROUND WORKING IMPLEMENT.
APPLICATION FILED SEPT. 13, 1918.
1,302,883.
Patented May 6, 1919.
3 SHEETS—SHEET 1.
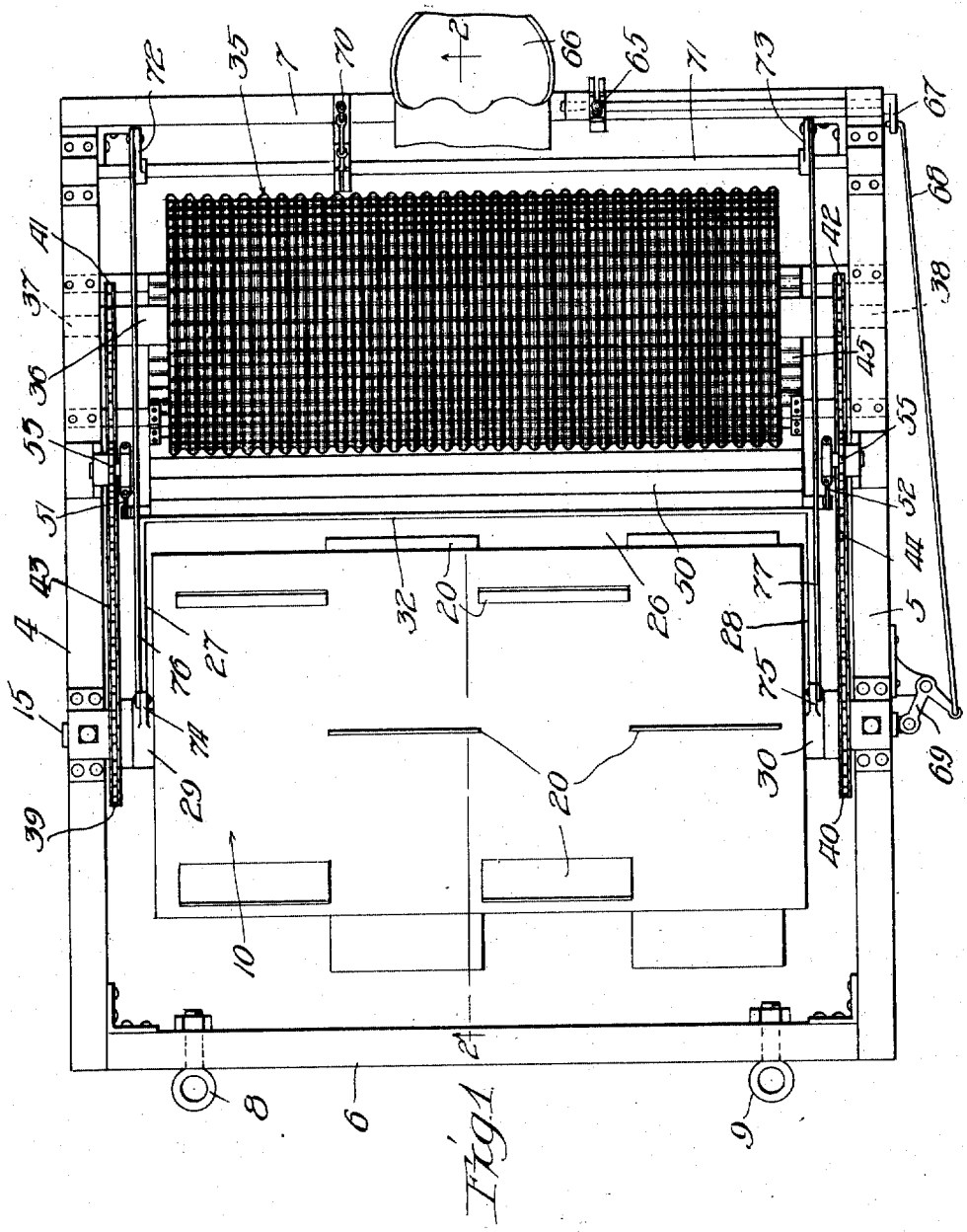
Inventor:
Charles M. Tilbury
by Banning Banning, Attys

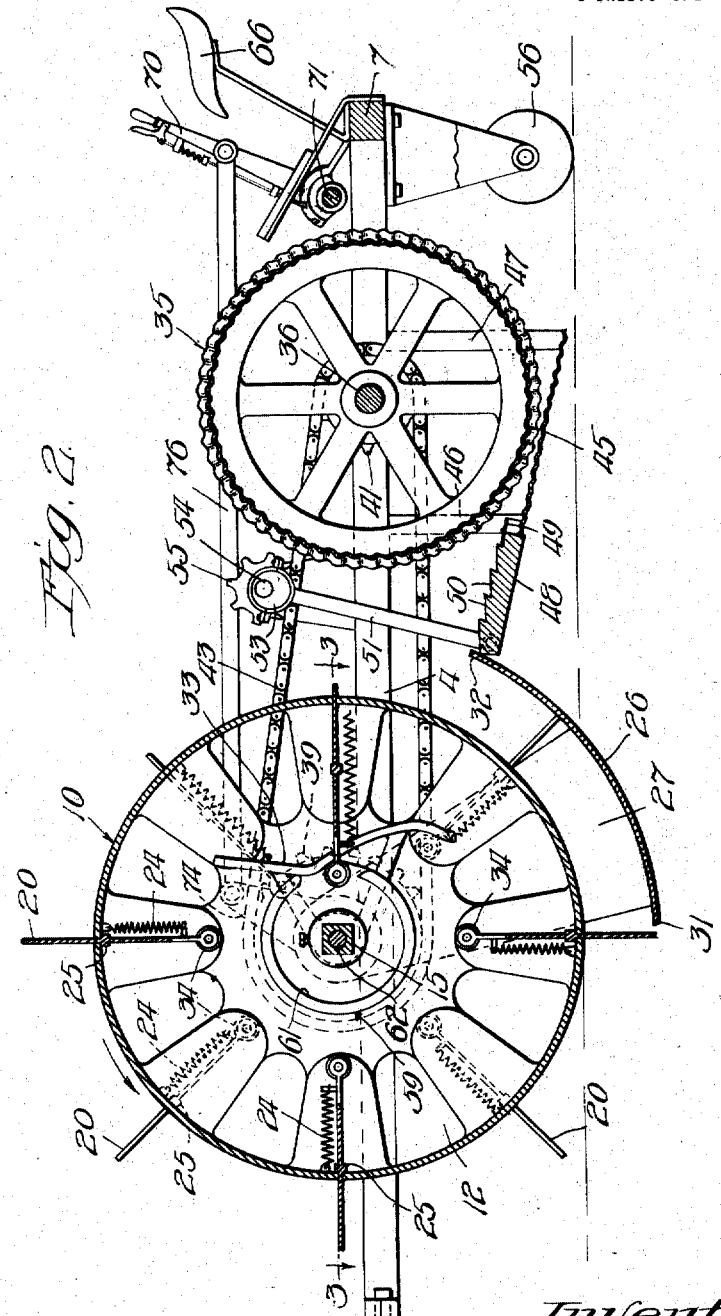

C. M. TILBURY.
GROUND WORKING IMPLEMENT.
APPLICATION FILED SEPT. 13, 1918.
1,302,883.
Patented May 6, 1919.
3 SHEETS—SHEET 3.
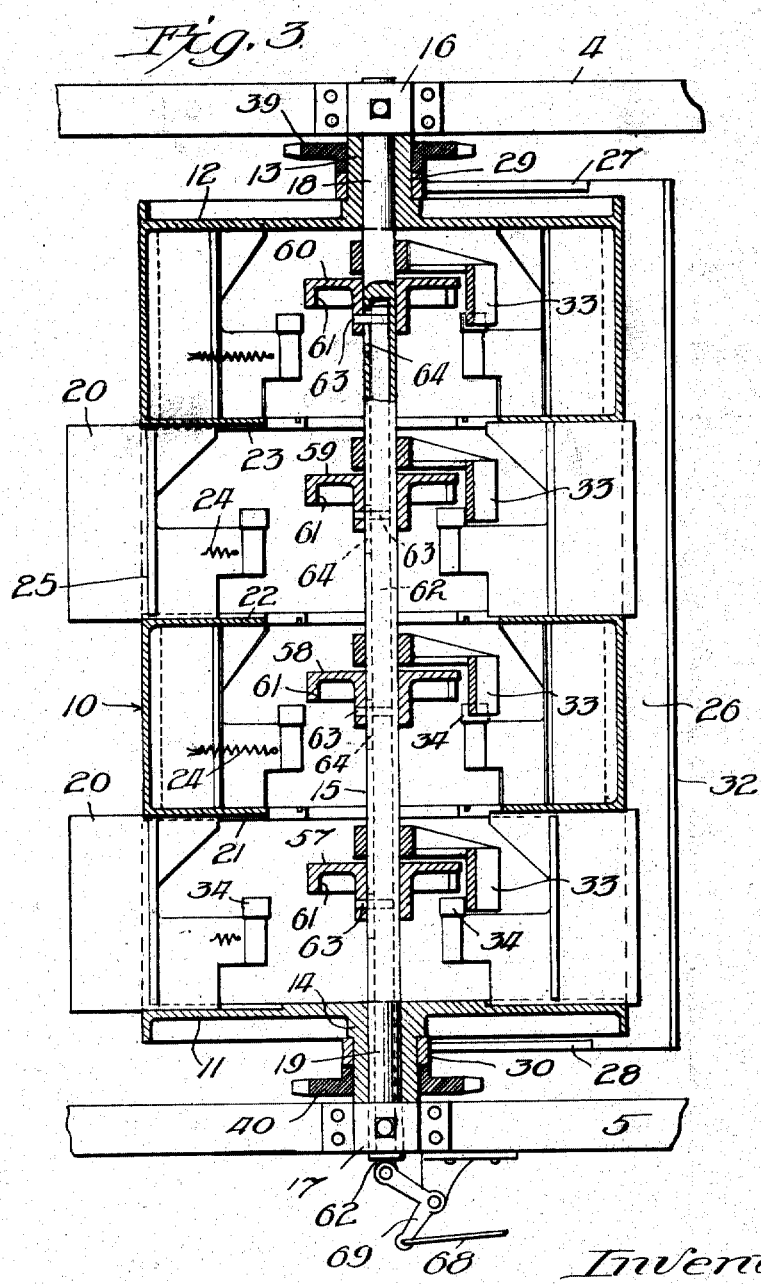
Inventor:
Charles M. Tilbury
by [signature]
Attys

UNITED STATES PATENT OFFICE.

CHARLES M. TILBURY, OF ZION CITY, ILLINOIS.

GROUND-WORKING IMPLEMENT.

1,302,883. Specification of Letters Patent. Patented May 6, 1919.

Application filed September 13, 1918. Serial No. 253,905.

*To all whom it may concern:*

Be it known that I, CHARLES M. TILBURY, a citizen of the Dominion of Canada, residing at Zion City, in the county of Lake and State of Illinois, have invented certain new and useful Improvements in Ground-Working Implements, of which the following is a specification.

The present invention has to do with improvements in ground working implements and the like—that is, implements for breaking up and pulverizing the earth preparatory to agricultural cultivation. More particularly the invention has to do with a machine whose main function is to pulverize in relatively fine degree the earth which has already been more or less broken up by the use of plowshares and harrows, or other implements. This pulverizing operation places the soil in better condition for cultivation and also tends to conserve the moisture beneath the surface in a manner well understood, particularly in what are known as the dry farming communities.

One of the objects of the invention is to provide a machine or implement of such construction that it will pulverize the soil to whatever distance below the surface may be necessary, taking up the relatively large clods or pieces, breaking them up and pulverizing them and finally delivering them back onto the surface.

Another object is to provide a very simple construction of mechanism for accomplishing the foregoing results and a construction which can be manufactured and operated in a relatively cheap manner.

Still another object is to so construct the machine that it can be readily moved across or along roads and other surfaces which it is desired not to pulverize, thereby making it possible to move the machine from point to point at times without performing the pulverizing function.

Other objects and uses of the invention will appear from the detailed description of the same which consists in the features of construction and combinations of parts hereinafter described and claimed.

In the drawings: Figure 1 shows a plan view of a simple type of machine embodying the features of the present invention; Fig. 2 shows a longitudinal vertical section taken on the line 2—2 of Fig. 1, looking in the direction of the arrows; and, Fig. 3 shows a fragmentary horizontal section taken on the line 3—3 of Fig. 2 looking in the direction of the arrows.

In the drawings I have illustrated and I shall now describe a simple form of machine or implement embodying the features of the present invention, but I wish it distinctly understood that in so doing I do not intend to limit myself to this partciular construction or embodiment, except as I may do so in the claims.

Bearing the foregoing fact in mind, the frame illustrated comprises the longitudinal bars or rails 4 and 5 which are joined together by the end bars or pieces 6 and 7. The machine can be drawn over the ground in any suitable manner, either by the use of animal power or mechanical power such as tractors, but in the construction illustrated I have provided the eyes 8 and 9 on the front bar 6 by means of which the traction may be applied to the implement.

In the forward portion of the frame is located a large cylindrical roller or the like 10. As shown in Figs. 2 and 3, this roller has the end plates 11 and 12 provided in their central portions with the journal bearings 13 and 14 respectively. A bearing rod 15 has its end portions solidly mounted or fastened onto the side rails 4 and 5 by means of the boxes 16 and 17 respectively, so that said bearing rod 15 is supported in a non-rotatable manner. The end portions 18 and 19 of this bearing rod are rounded and the journals 13 and 14 rotate on these rounded portions which thereby serve as journal mountings for the cylinder member 10. The central portion of the bearing rod is conveniently of squared or angular cross section, as is well shown in Fig. 2, for the purpose to be presently explained.

Within the cylinder member 10 are a number of sets of substantially radial blades 20 which are slidingly mounted in slots in the cylinder member so that during a portion of the rotation of such member they will be projected outwardly, whereas during another operation of such rotation they will be drawn inwardly, all of which is clearly shown in Fig. 2. In order to support the blades in their sliding movements, I have provided the radial webs or plates 21, 22 and 23 which have grooves or slots for additionally supporting the blades and giving them longer points of bearing and support in their sliding movements.

In the construction illustrated, there are shown four sets of blades located respectively at four positions along the length of the bearing rod 15, but, manifestly, the number of sets may be increased or decreased at the pleasure of the designer. Furthermore, in the construction illustrated, there are provided four blades in each set, thereby giving a relatively small angular clearance or distance between each pair of blades. The number of blades in each set may likewise be varied at the will of the designer. Means are provided for moving the blades in and out at the proper intervals during the rotation of the cylinder member, and, in the construction illustrated, the springs 24, working between the blades and the cylinder member, normally project the blades into their full extended position. Stops 25 on the blades serve to limit the amount of the outward throw.

During the operation of the machine, the cylinder 10 rotates in the direction shown by the arrow in Fig. 2, and the various blades are successively driven into the soil. In the ordinary operation of such an arrangement as has been so far described, the blades would be forced down into the soil and then drawn back or lifted out of the soil as the cylinder traveled over the surface of the ground, and the amount of the resulting breaking or pulverizing action would be dependent only upon the relatively small amount of agitation secured by such movements. I have, in the present case, however, made special provision for taking the soil so broken in an ordinary manner and delivering it to a pulverizing device whereby it is efficiently and thoroughly pulverized and then afterward delivered back onto the ground. This means includes an arcuate guide 26 supported in its side portions by the arms 27 and 28 which are swingingly mounted on the hubs 13 and 14 by means of the journals 29 and 30. The lower edge 31 of the arcuate guide 26 normally stands substantially below the axle or bearing bar 15 and at a distance beneath the surface of the soil substantially equal to the depth to which the pulverizing action is to be carried out. The upper edge 32 of said guide extends some distance above the surface of the soil, so that the material delivered up over said upper edge can be thereafter taken into the pulverizing device for pulverizing treatment. As a convenient construction, the arcuate guide is illustrated as being concentric with the cylinder 10 and with bearing bar 15, and as clearing the surface of the cylinder 10 by a distance substantially equal to the amount of projection of the blades 20 beyond the cylinder. By this arrangement the material broken in a preliminary manner by the blades will be moved up over the surface of the guide by the movement of the blades and delivered over the upper edge 32.

In order to insure a more perfect delivery of the material from the blades, it is desirable to provide means for drawing the blades inwardly as they pass upwardly away from the upper edge 32, thus forcibly removing from the blades any soil which might otherwise tend to stick to them. Such withdrawing means I have provided in the present case, and the same takes the form of a cam-shaped bar 33 for each set of blades, each blade having on its inner end a roller 34 adapted to engage said cam-shaped bar and be drawn inwardly thereby at the proper time in the rotation of the cylinder. Each cam-shaped bar is mounted in a stationary manner on the rod or bearing bar 15, and for this purpose the angular or squared cross section of said bar presents a simple and efficient manner of non-rotatable support for the cam bars.

After the material has been delivered from the arcuate guide, it may be re-deposited directly upon the surface of the ground or subjected to further pulverizing treatment, if that be necessary. I will, therefore, describe a pulverizing device which operates in conjunction with the mechanisms so far explained. This pulverizing device takes the form of a cylinder member 35 extending across the rear portion of the frame and carried by an axle 36 which is rotatably journaled in the frame at the points 37 and 38. The cylinder 35 is normally driven or rotated by the rotation of the cylinder 10. For this purpose, the hubs 13 and 14 carry the sprockets 39 and 40, and similar sprockets 41 and 42 are carried by the shaft 36. The chains 43 and 44 join together the respective pairs of sprockets in a driving manner. Ordinarily, the pulverizing cylinder will rotate at a somewhat greater speed than the cylinder 10, and this increased speed is readily secured by properly proportioning the sprockets—making the sprockets 41 and 42 smaller than the driving sprockets 39 and 40.

The cylinder 35 has a roughened or corrugated surface and, in the construction illustrated, the corrugations extend transversely as well as annularly around said cylinder. Beneath the cylinder 35 is a table or plate 45 which slants toward the rear and is supported relatively close to the lower portion of the cylinder 35 by means of the bars 46 and 47. This table 45 also has its surface roughened or corrugated, so as to better cooperate with the cylinder 35.

The upper portion 48 of the table is hinged to the rear portion thereof by the hinges 49 and said forward portion is provided with tooth-shaped grooves or the like 50, so that upon jogging the portion 48 up and down the soil or other material supported thereby will be crowded or forced toward the rear and driven between the cylinder 35 and table 45. Such jogging action is provided in the present case by means of the pitmen 51 and 52 connected at their lower ends to the portion 48 and at their upper ends to the eccentrics 53 on the stub shafts 54. Said stub shafts are journaled in the rails 4 and 5 respectively, and are provided with sprockets 55 which mesh with the chains 43 and 44 respectively.

It was previously explained that when traveling over some surfaces, such as roadways, it is desirable to throw the blades 20 out of commission and to raise the arcuate guide 26 so that the machine can travel over the road without operating upon its surface. In this connection it may also be mentioned that in the ordinary operation of the machine a trailer wheel 56 supports the rear portion of the frame at the desired elevation above the ground. In order to disable the blades or hold them locked at their innermost positions, I have provided the cam plates 57, 58, 59 and 60 which are slidably mounted on the squared portion of the bearing rod 15. Each of these cam plates has a circular cam surface 61 on its under face adapted to engage and retain at the innermost position the rollers 34 of its corresponding blades. That portion of each of said cam blocks adjacent to the corresponding cam block 33 is cut away, as will be readily understood from an examination of Fig. 2. Upon moving all of the cam blocks 57, 58, 59 and 60 sidewise into the position where they will coöperate with the rollers 33, they will take hold of said rollers and retain them at the innermost position during the forward travel of the machine, thereby holding the blades inwardly and in non-operative position. When the blades are to be thrown into commission, it is only necessary to move the cam blocks 57, 58, 59 and 60 sidewise the necessary amount.

A rod 62 is slidingly mounted within the bearing rod 15 and is connected to the various cam blocks by pins 63 extending through slots 64 in the bearing rod. The end portion of the control rod 62 is operatively connected to a lever 65 conveniently located adjacent to the driver's seat 66, such operative connection being effected through the medium of the crank arm 67, link 68 and bellcrank 69. The arcuate guide 26 can be raised and lowered under the control of the operator by means of a lever 70 located at a position convenient to the seat 66, said lever working on a shaft 71 which carries the crank arms 72 and 73 respectively. Said crank arms are connected to corresponding crank arms 74 and 75 by means of the links 76 and 77. By these constructions it is possible to control the disabling of the blades and the raising of the arcuate guide by the use of controlling devices convenient of access to the driver or operator seated on the seat.

I claim:

1. A ground working implement for the purpose specified, comprising in combination a frame, a ground roller journaled in the forward portion thereof, radial blades slidably mounted in said roller, means normally projecting said blades beyond the surface of the roller, an arcuate guide swingingly mounted concentric with the roller and normally standing in position to extend from a position beneath the roller upward to a position behind the same and clearing the roller by an amount substantially equal to the normal amount of projection of the blades beyond the roller, a pulverizing roller journaled in the rear portion of the frame, a table beneath and in coöperative relation with respect to said pulverizing roller, said table mounted in position to receive material delivered over the arcuate guide, means for rotating the pulverizing roller simultaneously with the rotation of the first mentioned roller, means under the control of the operator for retaining all of the blades in retracted position with respect to the roller, and means under the control of the operator for at times swinging the arcuate guide upwardly on its pivotal support, substantially as described.

2. A ground working implement for the purpose specified, comprising in combination a ground roller, a plurality of radial blades slidably mounted therein, means normally projecting said blades beyond the surface of the roller, an arcuate guide mounted concentric with respect to said roller and normally standing with its lower portion beneath the roller and clearing the roller by an amount substantially equal to the amount of projection of the blades beyond the surface of the roller, a pulverizing roller rotatably mounted behind the first mentioned roller, a pulverizing table beneath the same and in position to receive material delivered over the upper edge of the arcuate guide, and means for causing the pulverizing roller to rotate simultaneously with the first mentioned roller, substantially as described.

3. A ground working implement comprising in combination a ground roller, a plurality of blades slidably mounted therein, means normally projecting said blades beyond the surface of the roller, an arcuate guide normally standing with its lower portion beneath the roller and clearing the roller by an amount substantially equal to the amount of projection of the blades beyond the roller, and pulverizing means behind the roller and arcuate guide and receiving material delivered over the arcuate guide, substantially as described.

4. A ground working implement comprising in combination a roller, a plurality of blades movably mounted therein, means for projecting the said blades beyond the surface of the roller, an arcuate guide normally standing with its lower portion beneath the roller and clearing the roller by an amount substantially equal to the amount of projection of the blades beyond the roller, and pulverizing means in combination with the roller and arcuate guide and receiving material delivered over the arcuate guide, substantially as described.

5. A ground working implement comprising in combination a roller, a plurality of blades slidably mounted therein, means causing each of said blades to project from the surface of the roller in the lower portion of its travel and to be drawn back onto the surface of the roller during the upper portion of its travel for cleaning purposes, an arcuate guide normally standing with its lower portion beneath the roller and clearing the roller by an amount substantially equal to the amount of projection of the blades beyond the roller, and pulverizing means in conjunction with the guide and adapted to receive material delivered therefrom, substantially as described.

CHARLES M. TILBURY.

Copies of this patent may be obtained for five cents each, by addressing the "Commissioner of Patents, Washington, D. C."